United States Patent [19]
Robison

[11] Patent Number: 6,135,462
[45] Date of Patent: Oct. 24, 2000

[54] SNAP-IN CHUCK

[75] Inventor: Troy Robison, Ingleside, Ill.

[73] Assignees: Gary Sebastian, Lake Zurich; Thomas Vigil, Barrington, both of Ill.

[21] Appl. No.: 09/317,231

[22] Filed: May 24, 1999

[51] Int. Cl.$^7$ .......... B23B 31/107; B23B 31/12; B23B 31/22

[52] U.S. Cl. .............. 279/137; 279/22; 279/62; 279/71; 279/75; 279/902; 279/905

[58] Field of Search .................. 279/22, 71, 74, 279/75, 137, 905, 76, 906, 19.4, 60–65, 902

[56] References Cited

U.S. PATENT DOCUMENTS

| | | | |
|---|---|---|---|
| 751,345 | 2/1904 | Saunders | 279/22 |
| 799,787 | 9/1905 | Gessert . | |
| 1,656,450 | 1/1928 | Steuer | 279/22 |
| 1,775,992 | 9/1930 | Emrick | 279/137 |
| 2,409,899 | 10/1946 | Resina | 279/22 |
| 2,728,365 | 12/1955 | Austin | 81/438 |
| 2,807,473 | 9/1957 | Kiehne | 279/75 |
| 3,036,839 | 5/1962 | Williamson, Jr. | 279/76 |
| 3,945,653 | 3/1976 | Falche . | |
| 4,188,041 | 2/1980 | Soderberg . | |
| 4,199,160 | 4/1980 | Bent . | |
| 4,209,182 | 6/1980 | Sheldon | 279/75 |
| 4,275,893 | 6/1981 | Bilanceri . | |
| 4,514,117 | 4/1985 | Scott . | |
| 4,585,077 | 4/1986 | Bergler | 173/48 |
| 4,621,818 | 11/1986 | Rohm | 279/19.5 |
| 4,692,073 | 9/1987 | Martindell . | |
| 4,775,159 | 10/1988 | Manshitz | 279/19.5 |
| 4,900,202 | 2/1990 | Wienhold . | |
| 5,013,194 | 5/1991 | Wienhold . | |
| 5,062,749 | 11/1991 | Sheets | 279/75 |
| 5,193,824 | 3/1993 | Salpaka . | |
| 5,309,798 | 5/1994 | Markwart et al. | 81/438 |
| 5,409,333 | 4/1995 | Hu . | |
| 5,417,527 | 5/1995 | Wienhold . | |
| 5,458,445 | 10/1995 | Bader et al. . | |
| 5,464,229 | 11/1995 | Salpaka . | |
| 5,465,983 | 11/1995 | Owens et al. . | |
| 5,470,084 | 11/1995 | Reibetanz et al. | 279/137 |
| 5,470,180 | 11/1995 | Jore . | |
| 5,651,647 | 7/1997 | Ray . | |
| 5,674,031 | 10/1997 | Bilz et al. . | |
| 5,755,448 | 5/1998 | Kanaan et al. . | |
| 5,826,888 | 10/1998 | Weaver et al. . | |
| 5,873,580 | 2/1999 | Swenson, Sr. et al. . | |
| 5,904,456 | 5/1999 | Chern | 279/137 |
| 5,913,524 | 6/1999 | Barton . | |
| 5,921,562 | 7/1999 | Robison | 279/128 |
| 5,947,484 | 9/1999 | Huggins et al. . | |
| 5,951,024 | 9/1999 | Montjoy et al. . | |
| 5,951,026 | 9/1999 | Harman, Jr. et al. . | |
| 5,954,463 | 9/1999 | Jore . | |
| 5,967,713 | 10/1999 | Watzke . | |
| 5,984,596 | 11/1999 | Fehrle et al. | 279/75 |

*Primary Examiner*—Steven C. Bishop
*Attorney, Agent, or Firm*—Thomas Vigil

[57] ABSTRACT

The chuck assembly comprises: a chuck body having an outer end portion, an outer periphery and a central axial bore extending at least part way therethrough; a nose collar mounted on the outer end portion of the chuck body; structure for mounting the chuck body onto the outer end of a shaft of a powered drive mechanism; the outer end portion of the chuck body having at least one radially extending bore therein which extends from the outer periphery of the chuck body inwardly to an opening which opens to the central bore and which has a diameter less than the diameter of the radial bore; at least one ball or detent in the at least one radial bore; urging mechanism for urging the ball or detent into the radial bore and part way through the opening; releasing mechanism for allowing the ball or detent to move radially outwardly in the radial bore and away from the opening; and structure in the central bore for engaging a tool shank and preventing rotation of the tool shank relative to the chuck body.

24 Claims, 4 Drawing Sheets

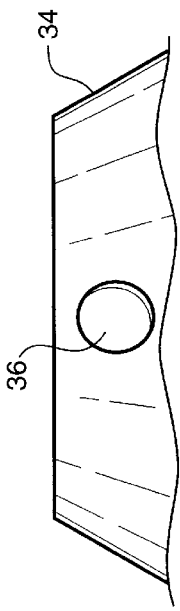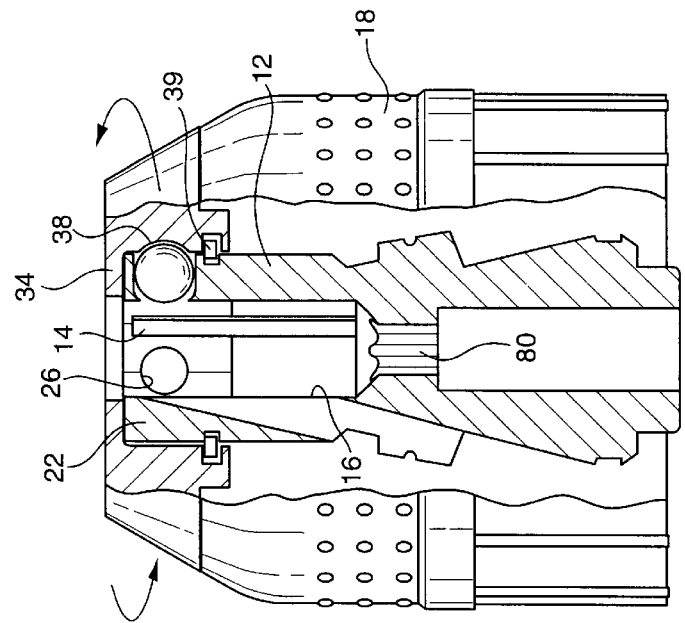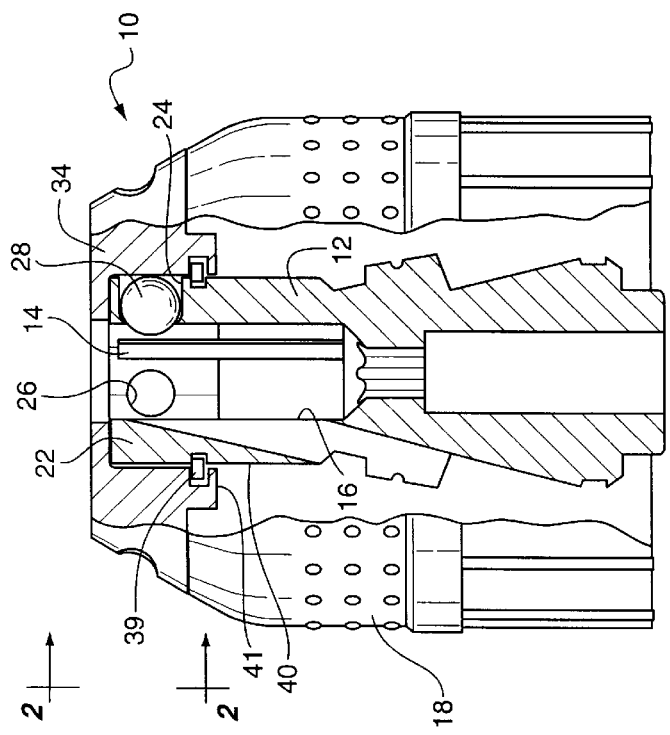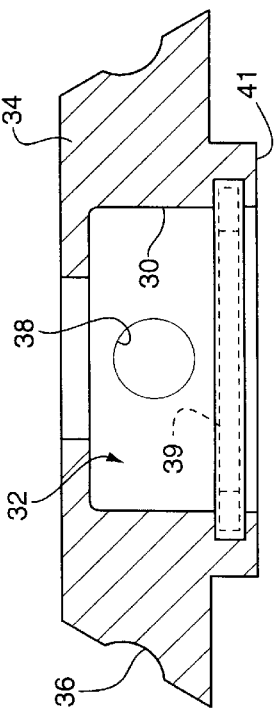

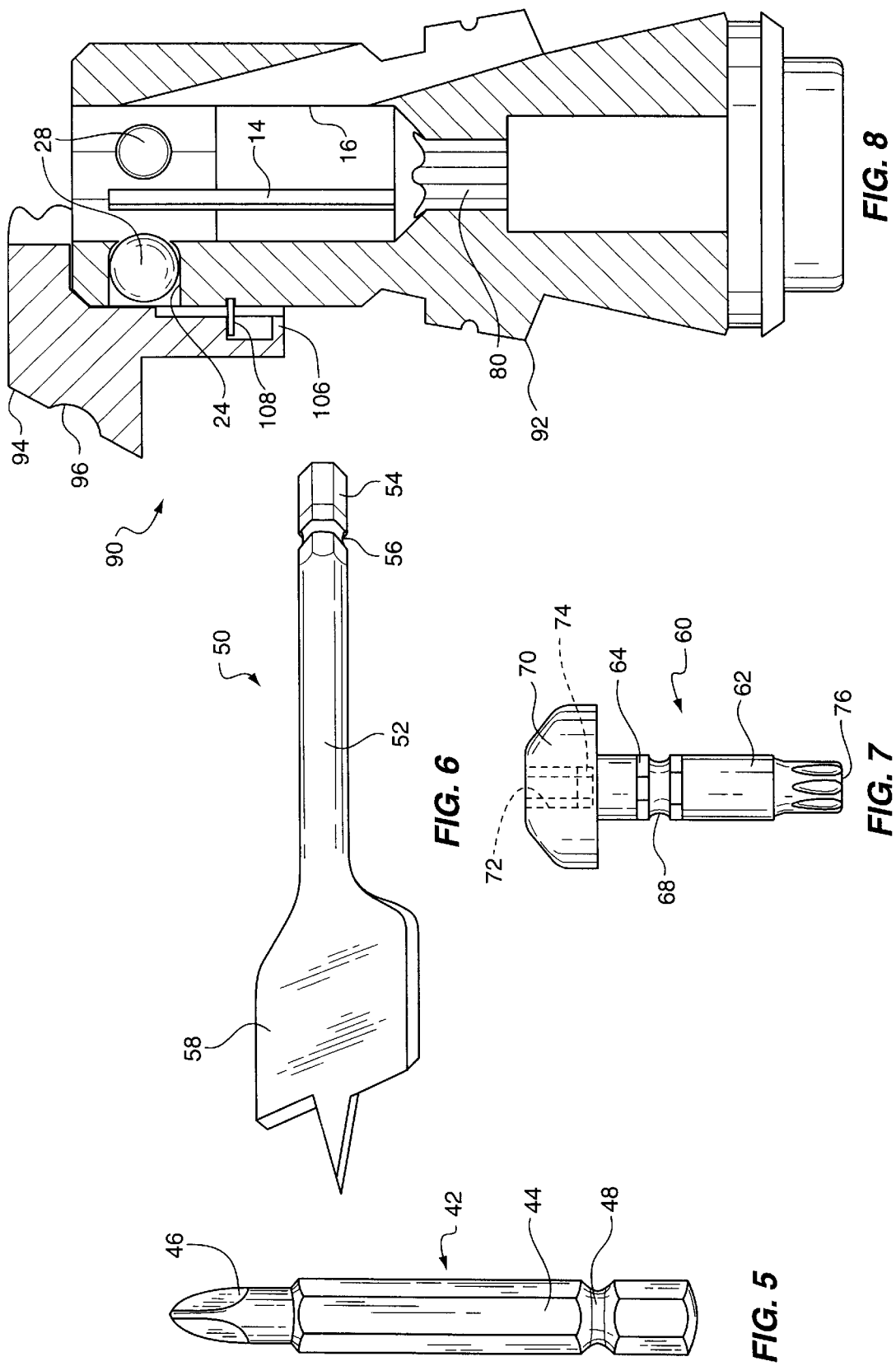

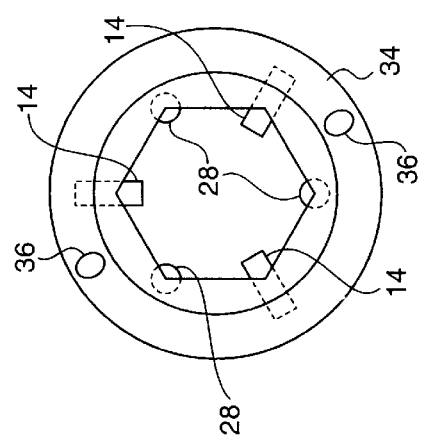
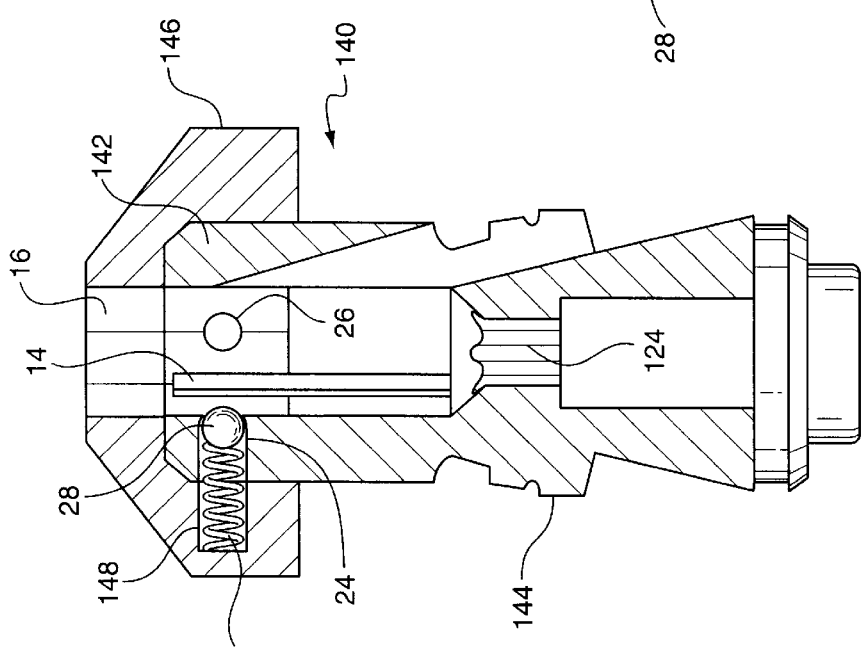
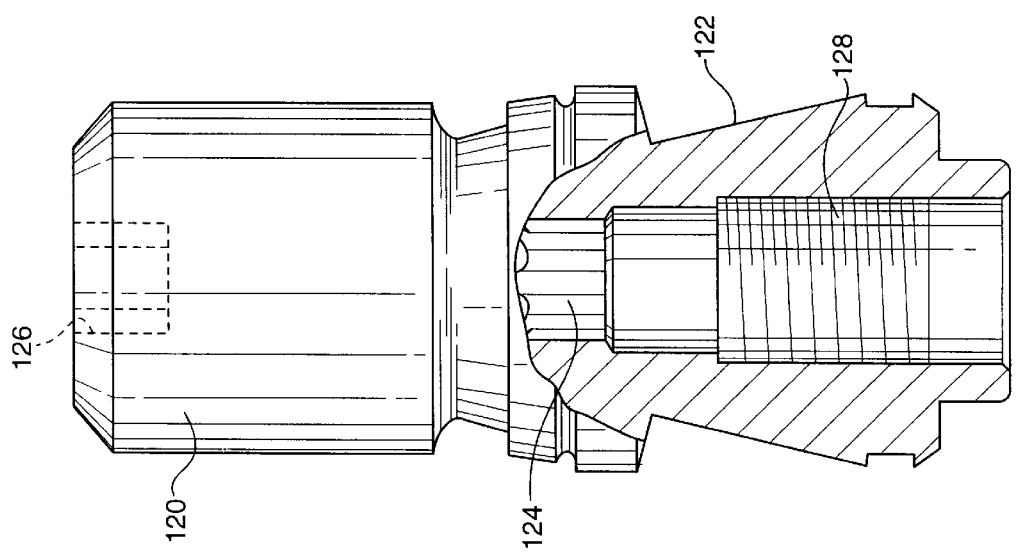

SNAP-IN CHUCK

BACKGROUND OF THE INVENTION

1. Field of the Invention

The present invention relates to a snap-in chuck assembly. More specifically, the present invention is directed to a chuck assembly which has a chuck body mounting conventional jaws which can be moved inwardly and outwardly of a central chuck bore to grippingly engage a shank of a tool, such as a drill bit or a screwdriver or a Phillips screwdriver, but which also has radially inwardly and outwardly movable detent structure, such as a ball, which can be moved into and out of engagement with an annular groove in the shank of a specially configured tool, to hold the tool in the chuck assembly without moving the jaws.

2. Description of the Prior Art

Heretofore chuck assemblies have utilized a special tool called a key for causing movement of jaws in a chuck radially of a central chuck bore to move the jaws radially inwardly and outwardly for gripping or releasing a tool received in the central chuck bore.

More recently chucks have been developed having a hand rotatable outer sleeve which can be rotated relative to a chuck body for moving the jaws of the chuck inwardly or outwardly of the central bore of the chuck without using a key.

Also, snap-in adapters and magnet adapters have been developed for holding tools in a tool holder where the tool holder has a stem which is fixed in the jaws of a chuck.

Examples of previously proposed analogous and non-analogous chuck assemblies and tool holders for chucks are disclosed in the following analogous and non-analogous U.S. patents:

| U.S. Pat. No. | Patentee |
| --- | --- |
| 3,945,653 | Falche |
| 4,188,041 | Soderberg |
| 4,199,160 | Bent |
| 4,692,073 | Martindell |
| 4,900,202 | Wienhold |
| 5,013,194 | Wienhold |
| 5,193,824 | Salpaka |
| 5,417,527 | Wienhold |
| 5,458,445 | Bader et al. |
| 5,464,229 | Salpaka |
| 5,465,983 | Owens et al. |
| 5,470,180 | Jore |
| 5,674,031 | Bilz et al. |

As will be described in greater detail hereinafter, the snap-in chuck assembly of the present invention can be a stand alone chuck or can be incorporated into a conventional chuck presently available on the market having jaws which are radially movable inwardly and outwardly of a central chuck bore of the chuck for gripping a tool and has a mechanism for allowing movement of a movable detent structure into and out of engagement with an annular groove in a shank of a tool or tool holder. In one embodiment, the central bore is non-circular, such as a hex bore for receiving a hex-in-cross-section shank of a tool having the annular groove therein.

SUMMARY OF THE INVENTION

According to the present invention there is provided a chuck assembly comprising: a chuck body having an outer end portion, an outer periphery and a central axial bore extending at least part way therethrough; a nose collar mounted on the outer end portion of the chuck body; structure for mounting the chuck body onto the outer end of a shaft of a powered drive mechanism; the outer end portion of the chuck body having at least one radially extending bore therein which extends from the outer periphery of the chuck body inwardly to an opening which opens to the central bore and which has a diameter less than the diameter of the radial bore; at least one ball or detent in the at least one radial bore; urging mechanism for urging the ball or detent into the radial bore and part way through the opening; releasing mechanism for allowing the ball or detent to move radially outwardly in the radial bore and away from the opening; and structure in the central bore for engaging a tool shank and preventing rotation of the tool shank relative to the chuck body.

BRIEF DESCRIPTION OF THE DRAWINGS

FIG. 1 is a longitudinal side view with portions broken away of one embodiment of a chuck assembly constructed according to the teachings of the present invention.

FIG. 2 is a fragmentary side view of the chuck shown in FIG. 1 and is taken along line 2—2 of FIG. 1.

FIG. 3 is a longitudinal plan view of the chuck similar to the view shown in FIG. 1 but with an outer end portion or nose collar rotated 90°.

FIG. 4 is a sectional view of the nose collar shown in FIG. 3 and is taken along line 4—4 of FIG. 3.

FIG. 5 is a longitudinal plan view of one embodiment of a drill type tool constructed according to the teachings of the present invention.

FIG. 6 is a longitudinal plan view of another embodiment of a screwdriver type tool constructed according to the teachings of the present invention.

FIG. 7 is a longitudinal plan view of one embodiment of a tool holder constructed according to the teachings of the present invention.

FIG. 8 is a longitudinal sectional view through a modified chuck body of a second embodiment of a chuck assembly constructed according to the teachings of the present invention, and of half of a nose collar of the chuck assembly, which is used to move a locking detent (ball) radially inwardly and outwardly of a central hex bore of the chuck assembly and shows the collar holding the detent/ball in an inwardly locking position.

FIG. 11 is a longitudinal side view of a chuck body for one of the embodiments of the chuck assembly disclosed herein with an inner or lower portion broken away to show a spline area of the central chuck bore and a threaded area of the chuck bore.

FIG. 12 is a longitudinal secional of a fourth embodiment of the chuck assembly of the present invention and shows a nose collar on a chuck body similar to the chuck body shown in FIG. 10 with lateral bores in the nose collar adapted to be aligned with radially extending bores in the chuck body.

FIG. 13 is an end view of the chuck body of each of the four embodiments and shows three jaws at three corners of the hex bore and three detents/balls at the other three corners of the hex bore between the jaws.

BRIEF DESCRIPTION OF THE PREFERRED EMBODIMENT(S)

Figure 10:
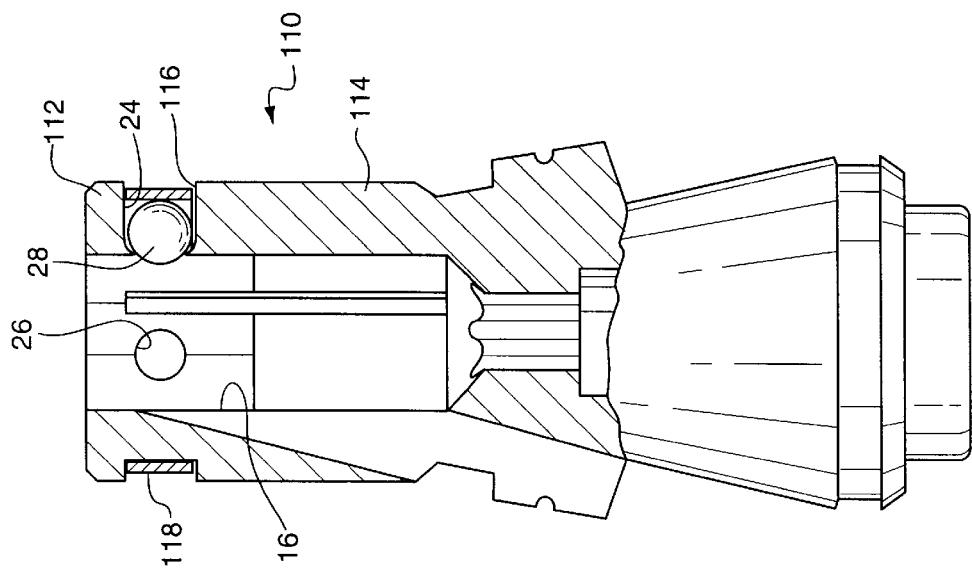
FIG. 10 is a longitudinal partially sectional view of a chuck body of a third embodiment of a chuck assembly constructed according to the teachings of the present invention and shows a detent/ball in a radially extending bore and an annular groove in the area of the radially extending bore and having a split collar spring based therein for biasing the detent/ball toward the central chuck bore.

Referring now to the drawings in greater detail, there is illustrated in FIG. 1 a longitudinal side view of one embodiment of the chuck assembly 10 constructed according to the teachings of the present invention. The chuck assembly 10 includes a chuck body 12 and at least three jaws 14, one of which is shown in FIG. 1, which are movable axially and radially relative to the chuck body 12 into and out of a central chuck hex bore 16. Mounted on the chuck body 12 is a sleeve 18 which is rotatable on the chuck body 12 for moving the jaws 14 in and out of the central bore 16.

The chuck body 12 includes an outer end portion 22 having at least one, and preferably three, transverse radial bores 24 therein which extend through the outer end portion 22 and opening onto the central bore 16 with a smaller opening 26 than the diameter of the radial bore 24. A ball 28, similar to a ball bearing, is received in each radial bore 24 and bears against an inner wall 30 of a cylindrical cavity 32 in a nose collar 34. To achieve this function, the outer end portion 22 most likely will have a reduced outer diameter such that the length of the radial bores 24 is less than the diameter of the ball 28 or a second ball or other spacing element is provided in each bore 24.

The hex cross section of the central bore 16 can be limited to the area of the radial bores 24, as shown.

As shown in FIGS. 1, 2 and 4, the nose collar 34 has two spaced apart finger engaging concave pockets or dimples 36 to enable a user to grip the collar 34 and rotate it 90°.

The inner wall 30 of the cavity 32 in the nose collar 34, FIGS. 3 and 4, has three concave pockets 38 which are located rotationally 120° from each other and one is located 90° from one of the outer pockets 36 or in line with one of the outer pockets 36.

The outer end portion 22 further has a C-ring 39 mounted on an outer periphery 40 thereof for axially engaging an inwardly extending flange 41 of the nose collar 34, thereby to hold the nose collar 34 to the chuck body 12.

In use, one inserts the stem or shaft of a conventional tool or a specially constructed tool 42 (FIG. 5) into the central bore 16 and rotates the sleeve 18 to move the jaws 14 into engagement with the stem of the tool 42.

Alternatively, and in accordance with the teachings of the present invention, one can insert the specially configured tool 42 (FIG. 5) into the bore 16. Then a stem 44 of the tool 42 has a hex cross-section for mating with the central hex bore 16. The tool 42 has a Phillips head 46 and an annular groove 48 which can be moved into alignment with the balls 28 when the nose collar 34 is in the position shown in FIG. 3 where each ball 28 is in line radially within one the radial bores 24 between the opening 26 to the central hex bore 16 and the pocket 38 in the wall 30.

This allows a tool, such as the tool 42, to be axially inserted into the central bore 16 past the balls 28 until the balls 28 are in radial alignment with the annular groove 48. At this point, a user can rotate the nose collar 34 to move the pockets 38 away from the balls 28, thereby to move the surface of the cylindrical wall 30 against the balls 28 urging them toward and into the opening 26 to the central bore 16.

Then, to remove the tool, such as a tool 42, from the central hex bore 16 of the chuck body 12, a user will grip the nose collar 34 with his/her finger and thumb received in the pockets 36 and rotate the nose collar 90° until the pockets 38 on the inner wall 30 of the cavity 32 are aligned with the radial bores 24 so that when one pulls on the tool 42 the balls 28 can move inwardly in the radial bores 28 and into the pockets 38 so that the tool 42 can be removed axially from the central chuck bore 16.

The tool 42 illustrated in FIG. 5 includes the hex in cross-section shank or stem 44, the Phillips head 46 and the annular groove 48 in the hex in cross-section shank or stem 44.

It will be understood that other types of tool heads, such as a drill tool head or a straight screwdriver tool head can be provided on the tool 42 in place of the Phillips screwdriver head 46.

In FIG. 6 is illustrated another tool 50 having a middle stem portion 52, a hex in-cross-section inner end 54 with an annular groove 56 therein, and a special drill head or spade bit 58 for drilling larger holes than the diameter of the stem portion 52. In FIG. 7 is illustrated a tool holder 60 which can be of the type disclosed in the Robison U.S. Pat. No. 5,921,562. The tool holder 60 has a middle stem portion 62 which is different than the stem disclosed in U.S. Pat. No. 5,921,562. In this respect, the stem portion 62 is modified to have a hex in-cross-section area 64 with an annular groove 68 in the hex in-cross-section area 64, whereby the tool holder 60 is adapted to be received in the central hex bore 16 and axially locked therein by balls 28 received in the annular groove 68 and fixed against rotation in the bore by the engagement of the hex in-cross-section area 64 with the hex cross-section central bore 16.

The tool holder 60 further has a mushroom head 70 with a cavity 72 for receiving a tool and a magnet 74 at the bottom of the cavity 72 for releasably holding a tool in the cavity 72. The tool holder 60 further includes an inner end 76 which has a spline configuration 78 for being received in a spline section 80 of the central bore 16. The spline section 80 of the central bore 16 an be of the type disclosed in the Salpaka U.S. Pat. No. 5,193,824, the disclosure of which is incorporated herein by reference.

Figure 9:
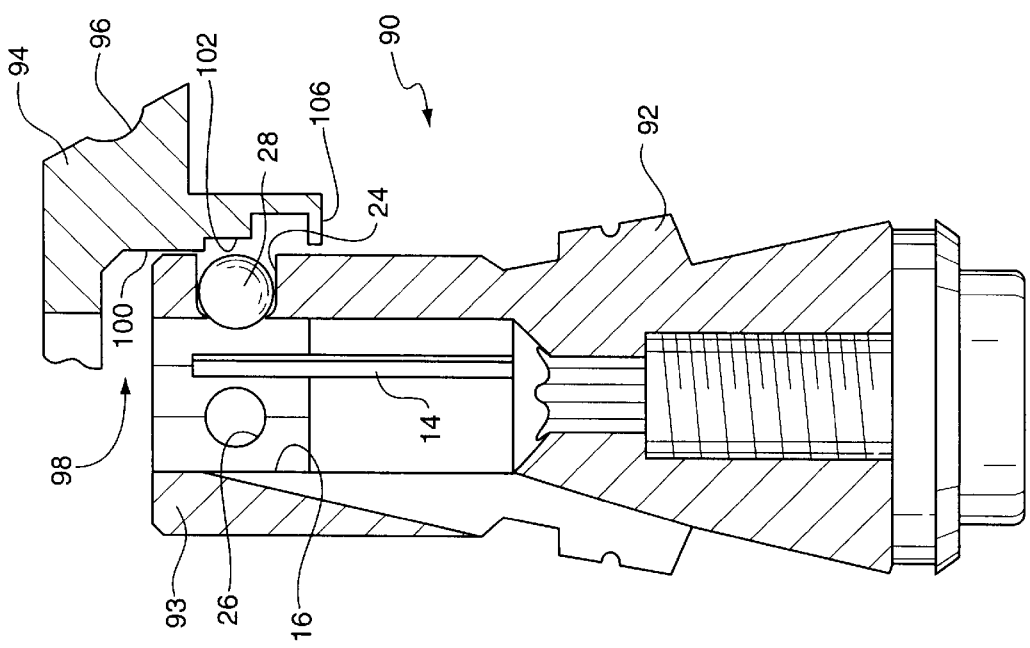
FIG. 9 is a longitudinal sectional view of the chuck body shown in FIG. 9 and shows the nose collar moved axially outwardly for placing the detent/ball in a non-restrained position where the detent/ball can move radially outwardly from a central hex bore.

In FIGS. 8 and 9 there is illustrated a second embodiment of a chuck assembly 90 constructed according to the teachings of the present invention wherein the construction of the chuck body 92 is identical to the construction of the chuck body 12 shown in FIGS. 3 and 4 with an outer end portion 93. However, in this embodiment, a nose collar 94 is constructed for axial movement as opposed to rotational movement. In this respect, as shown in FIG. 8, the nose collar 94 has at least two dimple concave pockets or dimples 96 on the outer surface thereof to enable one to grip the nose collar 94 and pull it or push it to move the nose collar 94 axially of the chuck assembly 90. Then, the interior of the nose collar 94 has a stepped cavity 98 including a first cylindrical portion 100 which has a diameter which will fictionally engage the ball or balls 28 in the radial bores 24 for urging them into and partially through the opening 26 of each radial bore 24 that opens to the central chuck bore 16. Then, the cavity 98 has a stepped, larger cylindrical portion 102 located inwardly of the cylindrical wall portion 100.

In use, and as shown in FIG. 9, when one grips the nose collar 94 and pulls it outwardly, the larger-in-diameter cylindrical wall portion 102 of the cavity 98 is radially aligned with the ball or balls 28 in each radial bore 24 so that they can move radially outwardly from the opening 26 that opens to the central bore 16, thereby to allow a tool to be inserted or removed from the hex in-cross-section central bore 16.

The nose collar 94 has a lower annular flange 106 for engaging a ring 108 mounted on the outer end portion 93 of the chuck body 92 for holding the nose collar on the outer end portion 93 and for limiting axial movement of the nose collar 94.

It is to be noted that the outer portion 93 of the chuck body 92 can have a reduced-in-diameter outer surface to provide a length of each radial bore 24 which is less than the diameter of the ball 28 so that a friction engagement between the balls 28 and the cylindrical wall portion 100 of the cavity 98 can be established.

In FIG. 10 there is illustrated a third embodiment of a portion of a chuck assembly 110 constructed according to the teachings of the present invention. In this embodiment, the outer end portion 112 of a chuck body 114 has an annular groove 116 therein in the area of the radial bores 24 so that a C or split ring or band 118 can be received in the annular groove 116 for engaging the radially outwardly facing side of each of the three detents or balls 28 for urging each of them into one of the openings 26 at the inner end of each of the radial bores 24. In this embodiment, the outer end portion 112 of the chuck body 114 does not have a reduced-in-diameter relative to the rest of the chuck body 114. Further, in this embodiment, when a tool is inserted into the hex bore 16, pressure must be applied to move the balls 28 radially outwardly against the pressure of the spring band 118 to enable the tool to be inserted into the central hex cross-section bore 16 of the chuck body 114. Likewise, when removing the tool from the hex bore 16, one must exert a pulling force to force the balls 28 against the spring band 118 to effect removal of the tool from the hex bore 16.

The outer periphery 120 of a chuck body 122 is illustrated in FIG. 11 with the bottom portion cut away to show a spline section 124 of a central hex bore 126 and an inner threaded section 128 of the chuck bore 126 for enabling the chuck body 122 to be mounted on a threaded end of a power tool as disclosed in the Salpaka U.S. Pat. No. 5,193,824.

In FIG. 12 there is illustrated a fourth embodiment of a chuck assembly 140 constructed according to the teachings of the present invention. In this embodiment, the outer end portion 142 of the chuck body 144 does not have a reduced-in-diameter relative to the remainder of the chuck body 144 and does not have any annular slot in the chuck body 144 in the area of the balls 28. Instead, a nose collar 146 is provided with three radial bores 148 which extend inwardly from and are equally spaced around a cylindrical wall 150 of a cavity 152 in the nose collar 146. Then, a spring 154 is inserted into each one of these three bores 148 and the nose collar 146 is moved axially over the outer end portion 142 of the chuck body 144 until the bores 148 with the springs 154 therein are in alignment with the bores 24 having the balls 28 therein, at which point the compressed springs 154 will move one of the bores 148 and into the radial bores 24 to engage and bear against the back side of each one of or the back one of a pair of the balls 28 in each radial bore 24.

It will be understood that suitable alignment means, such as for example matting axially extending slots in, and a key between, the outer end portion 142 of the chuck body 144 and the cylindrical wall 150 of the cavity 152 in the nose collar 146 is provided for ensuring proper alignment of the nose collar 146 with the chuck body 144 and locking of the nose collar 146 against rotation relative to the chuck body 144.

FIG. 13 is an end view of one of the nose collars, e.g. nose collar 34, shown in FIGS. 1, 3, 8, 9 and 12 showing the hex in-cross-section central bore 16 with jaws 14 located at alternate ones of the hex corners of the bore 16 and with balls 28 at the adjacent alternate corners of the hex bore 16.

It will be understood that the various embodiments of the chuck assembly of the present invention can preferably have a central hex bore 16. However, if desired one can utilize a drive directly from the spline section 80 or 124 to a spline configuration 78 on an inner end of a tool holder or tool for driving the tool, such that the hex bore can then be another configuration, e.g. a cylindrical bore as opposed to being a hex in cross-section bore.

Also, it will be understood that with the embodiments of the chuck assembly described above, one can insert a conventional tool having a cylindrical stem into the chuck assembly and rotate the sleeve 18 to bring the jaws 14 into gripping engagement with the tool.

In the alternative, one can insert a specially configured tool or tool holder, e.g. tool 42, tool 50 or tool holder 60 into the central hex in-cross-section bore 16 with the jaws 14 retracted, by a quick snap-in mounting, e.g., axially in and axially out of the tool 42 or 50 or tool holder 60.

From the foregoing descriptions, it will be understood that the chuck assemblies of the present invention have a number of advantages, some of which have been described above and others of which are inherent in the invention. Additionally, it will be noted that modifications can be made to the chuck assemblies of the present invention without departing from the teachings of the present invention. Accordingly, the scope of the invention is only to be limited as necessitated by the accompanying claims.

What is claimed is:

1. A chuck assembly comprising:

a chuck body having an outer end portion, an outer periphery and a central bore extending at least partially through said chuck body along a central axis;

said chuck body further having three, substantially equidistantly spaced, generally axially extending, jaw receiving slots which open onto said central bore mounting means for mounting said chuck assembly onto the outer end of a shaft of a drive mechanism;

three axially and radially movable jaws received in respective ones of said axially extending slots;

moving means for moving said jaws against the shank of a tool or tool holder received in said central bore;

said chuck body having three, substantially equidistantly spaced, inwardly extending bores therein with each bore being located in said chuck body between two of said generally axially extending slots, each inwardly extending bore extending from said outer periphery of said chuck body inwardly to an opening which opens to said central bore;

said opening having a diameter less than the diameter of said inwardly extending bores;

at least one detent in each inwardly extending bore;

resilient biasing means associated with each inwardly extending bore for resiliently biasing said ball or detent toward said central bore;

and drive structure in said central bore for engaging with mating drive structure on the shank of a tool or tool holder received in said central bore of said chuck body;

whereby said chuck assembly can impart a rotary drive to the tool or tool holder;

and whereby axial movement of the shank of a tool or tool holder received in the central bore of said chuck body is inhibited, if not prevented, by the engagement of said jaws or detents or both with the shank of the tool or tool holder.

2. The chuck assembly of claim 1 wherein said resilient biasing means comprises a generally C-shaped or circular split spring band received in an annular groove located in said outer periphery of said chuck body and passing over said three inwardly extending bores for urging said detents into said inwardly extending bore and part way through said opening.

3. The chuck assembly of claim 1 wherein said resilient biasing means comprises a spring in each inwardly extending bore and structure for holding each spring in each inwardly extending bore.

4. The chuck assembly of claim 1 wherein said drive structure comprises a spline configuration in said central bore of said chuck body.

5. The chuck assembly of claim 1 wherein said drive structure comprises a polygonal configuration in said central bore of said chuck body.

6. The chuck assembly of claim 1 wherein said drive structure comprises a polygonal configuration in said central bore of said chuck body and a spline configuration in said central bore of said chuck body at an inner end portion of said chuck body.

7. The chuck assembly of claim 4 combined with a tool or tool holder having a mating spline drive structure on a shank thereof at an inner end thereof.

8. The chuck assembly and tool or tool holder of claim 7 wherein said shank of said tool or tool holder has an annular groove therein for receiving said detent for holding said shank of said tool or tool holder against axial movement.

9. The chuck assembly of claim 5 combined with a tool or tool holder having a mating polygonal drive structure on a shank thereof.

10. The chuck assembly and tool or tool holder of claim 9 wherein said shank of said tool or tool holder has an annular groove therein for receiving said detent for holding said shank of said tool or tool holder against axial movement.

11. The chuck assembly and tool or tool holder of claim 10 wherein said annular groove is located in the area of said shank having said polygonal drive structure.

12. The chuck assembly of claim 6 combined with a tool or tool holder having a mating polygonal drive structure on a shank thereof and having a mating polygonal drive structure on said shank at an inner end of said shank.

13. The chuck assembly and tool or tool holder of claim 12 wherein said shank of said tool or tool holder has an annular groove therein for receiving said detent for holding said shank of said tool or tool holder against axial movement.

14. The chuck assembly and tool or tool holder of claim 13 wherein said annular groove is located in the area of said shank having said polygonal drive structure.

15. The chuck assembly of claim 1 combined with a tool or tool holder having an annular groove in a shank thereof for receiving said detents for holding said shank of said tool or tool holder against axial movement.

16. The chuck assembly and tool or tool holder of claim 5 wherein a biasing force of said resilient biasing means is such as to permit said tool or tool holder to be pushed into or pulled out of said central bore by hand.

17. The chuck assembly of claim 1 wherein said detent is a ball detent.

18. In combination, a chuck assembly and tool or tool holder, said chuck assembly comprising:

a chuck body having an outer end portion, an outer periphery and a central bore extending at least partially through said chuck body along a central axis;

said chuck body further having three, substantially equidistantly spaced, generally axially extending, jaw receiving slots which open onto said central bore;

mounting means for mounting said chuck assembly onto the outer end of a shaft of a drive mechanism;

three axially and radially movable jaws received in respective ones of said axially extending slots;

moving means for moving said jaws against the shank of a tool or tool holder received in said central bore;

said chuck body having at least one inwardly extending passageway located in said chuck body between two of said axially extending slots, said passageway extending from said outer periphery of said chuck body inwardly to an opening which opens to said central bore;

said opening having a diameter less than the diameter of said passageway;

at least one ball or detent in said passageway;

resilient biasing means associated with said passageway for resiliently biasing said ball or detent toward said central bore;

and drive structure in said central bore for engaging mating drive structure on the shank of a tool or tool holder received in said central bore of said chuck body; and, said tool or tool holder having a shank with mating drive structure thereon;

whereby said chuck assembly can impart a rotary drive to said tool or tool holder by reason of the mating engagement of said mating drive structures;

and whereby axial movement of said shank of said tool or tool holder received in said central bore of said chuck body is inhibited by the engagement of said jaws with said shank or by the engagement of said ball or detent with said shank or by both engagements.

19. The combination of claim 18 wherein said shank of said tool or tool holder has an annular groove therein for registering with said at least one ball or detent, whereby said tool or tool holder is releasably held against axial movement when said ball or detent is received in said annular groove except when a pulling force is applied to said tool or tool holder to pull said tool or tool holder from said central bore.

20. The combination of claim 18 wherein said drive structure in said central bore includes a spline configuration in said central bore and said drive structure on said shank is a mating spline configuration.

21. The combination of claim 18 wherein said drive structure in said central bore includes a polygonal configuration in said central bore and said drive structure on said shank is a mating polygonal configuration.

22. For use with a tool or tool holder having a shank and said shank having an annular groove therein and drive structure thereon, a chuck assembly comprising:

a chuck body having an outer end portion, an outer periphery and a central bore extending at least partially through said chuck body along a central axis;

said chuck body further having three, substantially equidistantly spaced, generally axially extending, jaw receiving slots which open onto said central bore;

mounting means for mounting said chuck assembly onto the outer end of a shaft of a drive mechanism;

three axially and radially movable jaws received in respective ones of said axially extending slots;

moving means for moving said jaws against the shank of a tool or tool holder received in said central bore;

said chuck body having at least one inwardly extending passageway located in said chuck body between two of said axially extending slots, said passageway extending from said outer periphery of said chuck body inwardly to an opening which opens to said central bore;

said opening having a diameter less than the diameter of said passageway;

at least one ball or detent in said passageway;

resilient biasing means associated with said passageway for resiliently biasing said ball or detent toward said central bore;

and drive structure in said central bore for engaging mating drive structure on the shank of a tool or tool holder received in said central bore of said chuck body;

whereby said chuck assembly can impart a rotary drive to the tool or tool holder by reason of the mating engagement of the mating drive structures;

and whereby axial movement of the shank of the tool or tool holder received in said central bore of said chuck body is inhibited, if not prevented, by the engagement of said jaws with the shank or by the engagement of said ball or detent in the annular groove in the shank or by both engagements.

23. The combination of claim 22 wherein said drive structure in said central bore includes a spline configuration in said central bore for mating with a mating spline configuration on the shank of the tool or tool holder.

24. The combination of claim 22 wherein said drive structure in said central bore includes a polygonal configuration for mating with a polygonal configuration on the shank of the tool or tool holder.

* * * * *